(12) United States Patent
Hongou et al.

(10) Patent No.: US 11,059,650 B2
(45) Date of Patent: Jul. 13, 2021

(54) PACKAGING BAG FOR HEATING IN MICROWAVE OVEN

(71) Applicant: Toyo Seikan Co., Ltd., Tokyo (JP)

(72) Inventors: Masahiro Hongou, Yokohama (JP); Kazumi Ozawa, Yokohama (JP); Takashi Miura, Yokohama (JP); Shie Matsunaga, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 16/335,568

(22) PCT Filed: Aug. 28, 2017

(86) PCT No.: PCT/JP2017/030809
§ 371 (c)(1),
(2) Date: Mar. 21, 2019

(87) PCT Pub. No.: WO2018/055989
PCT Pub. Date: Mar. 29, 2018

(65) Prior Publication Data
US 2020/0017276 A1  Jan. 16, 2020

(30) Foreign Application Priority Data
Sep. 23, 2016 (JP) .............................. JP2016-185756

(51) Int. Cl.
*B65D 81/00* (2006.01)
*B65D 81/34* (2006.01)
(Continued)

(52) U.S. Cl.
CPC .......... *B65D 81/3461* (2013.01); *B32B 27/08* (2013.01); *B32B 27/365* (2013.01);
(Continued)

(58) Field of Classification Search
CPC .... B65D 81/3461; B65D 33/01; B32B 27/08; B32B 27/365; B32B 2255/10; B32B 2323/04; B32B 2439/46; B32B 2439/70
(Continued)

(56) References Cited

U.S. PATENT DOCUMENTS 4,404,241 A * 9/1983 Mueller ................. B32B 27/10
                                                    383/103
4,929,482 A  5/1990 Moritani et al.
(Continued)

FOREIGN PATENT DOCUMENTS

JP  2555087 B2  11/1996
JP  2002-249176 A  9/2002
(Continued)

OTHER PUBLICATIONS

Communication dated May 1, 2020 from the Korean Intellectual Property Office in Application No. 10-2019-7011035.
(Continued)

*Primary Examiner* — Peter N Helvey
(74) *Attorney, Agent, or Firm* — Sughrue Mion, PLLC

(57) ABSTRACT

A packaging bag composed of a multilayer film and having a steam releasing mechanism. The multilayer film has at least a base layer and a welding layer and has a moisture content of not more than 1.0% in a state in which the packaging bag is filled with a content. The steam releasing mechanism has at least a steam releasing portion formed to have a maximal width of 3 to 20 mm. The internal pressure of the packaging bag is kept to be not more than 115 kPa during a period from the time the internal pressure is released through the steam releasing portion as a result of an increase in the internal pressure caused by heating in a microwave oven to the time the heating in the microwave oven finishes.

11 Claims, 3 Drawing Sheets

(51) Int. Cl.
  *B32B 27/08* (2006.01)
  *B32B 27/36* (2006.01)
  *B65D 33/01* (2006.01)

(52) U.S. Cl.
  CPC .......... *B65D 33/01* (2013.01); *B32B 2255/10* (2013.01); *B32B 2323/04* (2013.01); *B32B 2439/46* (2013.01); *B32B 2439/70* (2013.01)

(58) Field of Classification Search
  USPC ........................................................ 383/103
  See application file for complete search history.

(56) References Cited

U.S. PATENT DOCUMENTS

| | | | | |
|---|---|---|---|---|
| 7,637,283 | B2* | 12/2009 | Hoffman | B65D 77/225 137/843 |
| 8,746,281 | B2* | 6/2014 | Morin | B32B 27/36 137/852 |
| 2003/0123758 | A1* | 7/2003 | Mita | B65D 81/3461 383/38 |
| 2006/0257056 | A1* | 11/2006 | Miyake | B65D 77/225 383/103 |
| 2008/0206556 | A1* | 8/2008 | Kuwahara | C08J 7/04 428/335 |
| 2009/0035424 | A1* | 2/2009 | Mita | B32B 27/08 426/113 |

FOREIGN PATENT DOCUMENTS

| | | |
|---|---|---|
| JP | 2003-192042 A | 7/2003 |
| JP | 2005-225544 A | 8/2005 |
| JP | 2006-143223 A | 6/2006 |
| JP | 2008-81202 A | 4/2008 |
| JP | 2012-153406 A | 8/2012 |
| JP | 2016-49781 A | 4/2016 |

OTHER PUBLICATIONS

International Search Report for PCT/JP2017/030809 dated Oct. 3, 2017 (PCT/ISA/210).

* cited by examiner

PACKAGING BAG FOR HEATING IN MICROWAVE OVEN

CROSS REFERENCE TO RELATED APPLICATIONS

This application is a National Stage of International Application No. PCT/JP2017/030809 filed Aug. 28, 2017, claiming priority based on Japanese Patent Application No. 2016-185756 filed Sep. 23, 2016.

TECHNICAL FIELD

The present invention relates to a packaging bag that has a steam releasing mechanism and that is used for heating in a microwave oven. More specifically, the present invention relates to a packaging bag that can prevent thermal damage caused by heating in a microwave oven, irrespective of properties of contents.

BACKGROUND ART

Various kinds of food products packed in packaging bags have been proposed. Such a packed food product is prepared by filling a packaging bag with a content like food and tightly sealing the bag for heating in a microwave oven at the time of consumption of the food. The packaging bag for a food product is provided with a steam releasing mechanism for releasing the internal pressure of the packaging bag in order to save labor of opening the packaging bag at the time of heating in a microwave oven, and to prevent breakage of the bag even during heating in a microwave oven (see Patent documents 1 and 2, for instance).

However, even such a packaging bag comprising a steam releasing mechanism for heating in a microwave oven can be damaged due to heat applied by the heat of the content and the internal pressure (specifically, the film may be melted or perforated due to heat) when it is heated consecutively under a high-pressure condition at the time of heating in a microwave oven, though it depends on the properties of the content.

In order to solve these problems, Patent document 2 proposes use of a film having a greater heat resistance, such as a polybutylene terephthalate-based film, for the base layer constituting the bag for heating in a microwave oven.

PRIOR ART DOCUMENTS

Patent Documents

Patent Document 1: JP 2002-249176A
Patent Document 2: JP 2003-192042A
Patent Document 3: JP 2006-143223A

SUMMARY OF THE INVENTION

Problems to be Solved by the Invention

The Patent document 3 describes use of a polybutylene terephthalate-based film as the base resin having excellent heat resistance, so as to prevent thermal damage caused by heating in a microwave oven even when the content contains considerable amounts of moisture, oil and sugar. However, even the polybutylene terephthalate-based film having excellent heat resistance cannot accommodate necessarily all the contents and the conditions of internal pressure. That is, the film is still unsatisfactory since the packaging bag is thermally damaged due to the heating in a microwave oven depending on the conditions for the heating in a microwave oven or the properties of the contents.

Therefore, an object of the present invention is to provide a packaging bag for heating in a microwave oven, the packaging bag can prevent leakage of contents caused by increase in the internal pressure as a result of heating in a microwave oven, and furthermore, the packaging bag can prevent effectively thermal damage irrespective of the properties of the contents.

Means for Solving the Problems

The present invention provides a packaging bag including a multilayer film and having a steam releasing mechanism. The multilayer film has at least a base layer and a welding layer, the multilayer film has a moisture content of not more than 1.0% in a state in which the packaging bag is filled with a content, the steam releasing mechanism has at least a steam releasing portion formed to have a maximal width in a range of 3 to 20 mm, and the packaging bag has an internal pressure kept to be not more than 115 kPa during a period from the time the internal pressure is released through the steam releasing portion as a result of an increase in the internal pressure caused by heating in a microwave oven to the time the heating in the microwave oven finishes (hereinafter, the period may be called simply "after steam release").

It is preferable in the packaging bag of the present invention that:
1. layers each constituting the multilayer film have a moisture content of not more than 0.6% immediately after retort sterilization under conditions of 121° C. and 30 minutes, and the layers except the welding layer and the adhesive layer are formed of a resin having a melting point of not lower than 220° C.;
2. the base layer is formed of a resin selected from the group consisting of a polyester resin, a polycarbonate resin, and a polyetheretherketone resin;
3. the base layer is formed of a material selected from the group consisting of polyethylene terephthalate, polybutylene terephthalate, polyethylene naphthalate, a blend of polyethylene terephthalate and polybutylene terephthalate, and a blend of polyethylene terephthalate and polyethylene naphthalate;
4. the multilayer film has a multilayer structure including a barrier layer formed of a polyester resin and having either a vapor-deposited layer or a coating layer arranged to face the base layer;
5. the multilayer film has a layer constitution including the barrier layer, the base layer and the welding layer in this order when viewed from the outside, the barrier layer is formed of a polyethylene terephthalate resin and has either the vapor-deposited layer or the coating layer, the base layer is formed of polybutylene terephthalate, and the welding layer is formed of an unstretched polypropylene;
6. the steam releasing, portion is shaped to have an arc having a curvature radius of 2 to 100 mm relative to a chord having a width of 3 to 20 mm;
7. the steam releasing mechanism is arranged in the vicinity of a peripheral seal portion of the packaging bag, and a maximal width direction of the steam releasing portion is tilted from an upper edge to a side edge of the packaging bag;
8. the steam releasing mechanism is arranged in the vicinity of the peripheral seal portion of the packaging bag, and the maximal width direction of the steam releasing portion is in parallel with the side edge or the upper edge of the packaging bag; and 9. the steam releasing mechanism includes the steam releasing portion, an unbonded portion formed around the steam releasing portion, and a steam releasing seal portion formed around the unbonded portion.

Effects of the Invention

The present inventors studied earnestly about the thermal damage on the packaging bag for heating in a microwave oven and found that it is possible to prevent the thermal damage irrespective of the contents when the moisture content of the multilayer film constituting the packaging bag as a whole remains not more than 1.0% and the internal pressure of the packaging bag after steam release is kept to be not more than 115 kPa.

The effect of the present invention is demonstrated from the results in Examples described later.

In Comparative Example 2, the internal pressure of the packaging bag after steam release is not more than 115 kPa, but the multilayer film has a moisture content of more than 1.0%. In each of Comparative Examples 3 to 6, the moisture content of the multilayer film is not more than 1.0%, but the internal pressure of the packaging bag after steam release is more than 115 kPa. Further in Comparative Example 1, both the moisture content of the multilayer film and the internal pressure of the packaging bag after steam release are out of the aforementioned ranges. The packaging bags in these Comparative Examples are thermally damaged.

In contrast, the packaging bag in each of Examples 1 to 17 comprises a multilayer film having a moisture content of not more than 1.0% as a whole, and the internal pressure of the package after steam release is kept to be not more than 115 kPa. It is evident that the packaging bags can be heated without thermal damage even when they are filled with a viscous content containing a metal salt and oil (e.g., a ready-to-eat curry, toppings for rice bowls, and soups).

Figure 1:
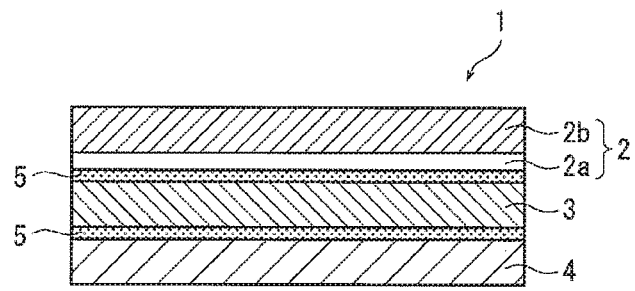
FIG. 1 is a view showing a cross-sectional structure of an example of multilayer film used in the present invention.

MODE FOR CARRYING OUT THE INVENTION (Multilayer Film)

The essential characteristic of the multilayer film constituting the packaging bag of the present invention is that it has at least a base layer and a welding layer, and it has a moisture content of not more than 1.0% in a state in which the packaging bag is filled with a content.

It is considered that thermal damage in heating in a microwave oven is caused by heat and high pressure applied from the content to the packaging bag when the internal pressure is kept extremely high after the multilayer film absorbs moisture.

The multilayer film used in the present invention has a moisture content of not more than 1.0% in a state being filled with contents. As a result, the heat resistance of the multilayer film is kept as a whole to effectively prevent deterioration in the heat resistance even when the internal pressure is high. The steam releasing mechanism described later may also serve to enhance the effect. Here, a product "filled with contents" corresponds to a commercially available product, specifically for instance, a product at any timing after aseptic filling or hotpack filling, or after thermal sterilization by boiling or retorting. The moisture content of the film may be the highest immediately after the heat sterilization.

For providing the aforementioned moisture content of the multilayer film in a state in which the bag is filled with contents, each of the layers constituting the multilayer film preferably has a moisture content of not more than 0.6% immediately after retort sterilization under the conditions of 121° C. and 30 minutes.

It is particularly preferable that a heat resistant resin having a melting point of 220° C. or higher is used to form the respective layers except the welding layer and the adhesive layer.

[Base Layer]

The packaging bag of the present invention has a multilayer film comprising a base layer of a resin complying with the moisture content and the melting point, and the resin comprises preferably any of a polyester resin, a polycarbonate resin, and a polyetheretherketone resin. Particularly preferably, it comprises any of polybutylene terephthalate, polyethylene terephthalate, polyethylene naphthalate, a blend of polyethylene terephthalate and either polybutylene terephthalate or polyethylene naphthalate, a copolymer of polyethylene terephthalate/polyethylene naphthalate. Here, it is preferable that the mixing ratio of polyethylene terephthalate to either polybutylene terephthalate or polyethylene naphthalate is within a range of 70:30 to 95:5 (weight ratio).

It is preferable that the film constituting the base layer is uniaxially or biaxially stretched. A biaxially-stretched film is used particularly preferably since it has excellent mechanical strength, crack resistance, and heat resistance.

For the base layer, any of these films can be used alone, or various films may be laminated by the below-mentioned manner to form a multilayer base layer.

Preferably, the base layer has a thickness in a range of 5 to 50 μm, particularly 10 to 30 μm. When the thickness of the base layer is less than the range, the mechanical strength and the crack resistance may be inferior in comparison with a base layer having a thickness within the range. When the same thickness is more than the range, the tearability and economic efficiency may be inferior in comparison with a base layer having a thickness within the range.

[Welding Layer]

For the welding layer constituting the multilayer film, a heat-sealable resin used for a welding layer (heat seal layer) of a conventional packaging bag for heating in a microwave oven can be used as long as the moisture content of the layer immediately after retort sterilization under conditions of 121° C. and 30 minutes is not more than 0.6%. Specific examples thereof include a low-, medium- or high-density polyethylene, linear low density polyethylene, isotactic polypropylene, syndiotactic polypropylene, an ethylene-propylene copolymer, polybutene-1, poly4-methyl-1-pentene, an ethylene-butene-1 copolymer, a propylene-butene-1 copolymer, an ethylene-propylene-butene-1 copolymer, an ethylene-vinyl acetate copolymer, an ionically crosslinked olefin copolymer (ionomer), and an ethylene-acrylic acid ester copolymer. These can be used alone or as a blend of two or more kinds thereof.

From the viewpoint of heat resistance, a propylene-based polymer is particularly appropriate. Namely, homopolypropylene, a random copolymer or a block copolymer based on propylene can be used.

Further, from the viewpoint of weldability, it is particularly preferable that the film constituting the welding layer is unstretched.

Preferably, the welding layer has a thickness in a range of 30 to 150 μm, and particularly, in a range of 50 to 100 μm. When the thickness of the welding layer is less than the range, the drop strength and the heat seal property may be inferior in comparison with a welding layer having a thickness within the range. When the thickness is more than the range, the tearability and the economic efficiency may be inferior in comparison with a welding layer having a thickness within the range.

[Others]

The multilayer film constituting the packaging bag of the present invention may include the aforementioned base layer and the welding layer and further any other layers to be used for a conventional packaging bag for heating in a microwave oven, as long as the moisture content immediately after sterilization under conditions of 121° C. and 30 minutes is not more than 0.6%, and the melting point is not lower than 220° C. More specifically, the film can include a barrier layer, an easily-tearable layer, an adhesive layer and the like, though the present invention is not limited to these examples. It is particularly preferable in the present invention that the film includes a barrier layer. A printing layer may be arranged on any site of the multilayer film.

[Barrier Layer]

A preferred example of the barrier layer comprises a vapor-deposited layer that is formed by depositing an inorganic materials such as silicon oxide, ceramics such as alumina, carbon or the like, on a resin film used for the base layer, and the deposition method may be any method such as chemical vapor deposition (CVD), vacuum deposition, sputtering, ion plating and the like. Another preferred example of the barrier layer comprises a coating layer that is formed on the resin film, and the coating layer is formed from a barrier resin coating agent such as a polycarboxylic acid polymer, vinylidene chloride, or a compound of an ethylene vinyl alcohol copolymer or a metalloxane bond. Among them, a vapor-deposited layer of silica or alumina is used particularly preferably.

It is preferable that the resin film used for the barrier layer is biaxially stretched.

The barrier layer may be an outermost layer (arranged outside the base layer), or it may be interposed between the base layer and the welding layer.

The resin film on which the vapor-deposited layer or the coating layer is formed has a thickness preferably in a range of 5 to 25 μm. When the thickness of the resin film is less than the range, the mechanical strength and the crack resistance may be inferior in comparison with a resin film having a thickness within the range. When the thickness is more than the range, the tearability and the economic efficiency may be inferior in comparison with a resin film having a thickness within the range.

[Easily-Tearable Layer]

An easily-tearable layer is provided adjacent to the less-tearable welding layer in order to make the welding layer adapt to the easily-tearable layer, thereby improving the tearability of the packaging bag.

An example of the film constituting the easily-tearable layer is a film of a blend of polybutylene terephthalate containing a polytetramethylene glycol unit and polyethylene terephthalate, or a film of a blend of polyethylene terephthalate and polyester elastomer where the polyester elastomer is dispersed in the polyethylene terephthalate, any of these films is biaxially stretched, though the present invention is not limited to these examples. Another example is a film prepared by severing a polyester film with laser, a knife or the like in order to provide tearability.

The easily-tearable layer preferably has a thickness in a range of 5 to 30 μm. When the thickness of the resin film is less than the range, the mechanical strength and the crack resistance may be inferior in a comparison with an easily-tearable layer having a thickness within the range. When the thickness is more than the range, the tearability and the economic efficiency may be inferior in a comparison with an easily-tearable layer having a thickness within the range.

[Multilayer Structure]

The multilayer film used in the present invention includes at least a base layer and a welding layer. Preferably, any other layer like a barrier layer may be formed, as mentioned above.

FIG. 1 shows an example of a multilayer film used in the packaging bag of the present invention. The multilayer film indicated with a reference numeral 1 as a whole comprises a barrier layer 2, a base layer 3, and a welding layer 4 in this order when viewed from the outside, and adhesive layers 5 are interposed between the respective layers.

In the embodiment shown in FIG. 1, the barrier layer 2 consists of a polyester resin layer 2b having a layer 2a, i.e., a vapor-deposited layer or a coating layer. A barrier layer having a multilayer structure with this vapor-deposited layer or coating layer (2a) arranged to face the base layer 3 can be used preferably.

The multilayer film used preferably in the present invention includes a barrier layer, a base layer and a welding layer in this order when viewed from the outside, where the barrier layer is formed of a polyethylene terephthalate resin having either a vapor-deposited layer or a coating layer; the base layer is formed of polybutylene terephthalate; and the welding layer is formed of unstretched polypropylene. Another example of the multilayer film that can be used preferably includes a barrier layer, a base layer and a welding layer in this order when viewed from the outside, where the barrier layer is formed of a polybutylene terephthalate resin having either a vapor-deposited layer or a coating layer; the base layer is formed of polyethylene terephthalate; and the welding layer is formed of unstretched polypropylene. A further example of such a preferred multilayer film has a layer constitution including a base layer, a barrier layer and a welding layer in this order, where the base layer is formed of polybutylene terephthalate; the barrier layer is formed of polyethylene terephthalate resin having either a vapor-deposited layer or a coating layer; and the welding layer is formed of unstretched polypropylene.

Depending on the properties of the content or the conditions for heating in a microwave oven, a multilayer film having the aforementioned layer constitution from which the base layer is excluded can be used preferably. In this case, the thickness of the resin film of the barrier layer can be set suitably within a range of 5 to 25 μm, taking the thermal damage or the like of the packaging bag into consideration.

The multilayer film used in the present invention can be formed by any of conventionally-known lamination methods such as dry lamination, sandwich lamination, extrusion lamination, and thermal lamination.

For instance, it is possible to prepare separately the films of the base layer, the welding layer and the barrier layer, and to laminate the films later by dry lamination, though the present invention is not limited to the method.

In another example of production of the multilayer film, polybutylene terephthalate for constituting the base layer is extruded and laminated on the film constituting the barrier layer having either the vapor-deposited layer or the coating layer. In other words, the polybutylene terephthalate is extruded and laminated on the vapor-deposited layer or the coating layer, thereby forming a laminate consisting of two layers of the barrier layer and the base layer. On the other surface of the base layer, polypropylene for constituting the welding layer is extruded and laminated via an adhesive resin.

Examples of the adhesive that can be applied to the multilayer film used in the present invention include conventionally-known adhesives based on urethanes such as polyether polyurethane and polyester polyurethane, epoxy-based adhesives, or adhesives of acid-denatured thermoplastic resin, such as maleic anhydride modified polypropylene. From the viewpoint of retort resistance, urethane-based adhesives may be used preferably.

(Packaging bag)

The packaging bag of the present invention, which is used for heating in microwave oven, is formed by overlapping the multilayer films such that the welding layers of the multilayer film may face each other, and by welding the layers on the edges. The packaging bag may open automatically during heating in a microwave oven to keep the internal pressure of the packaging bag after steam release to be not more than 115 kPa. Further, the packaging bag is provided with a steam releasing mechanism capable of controlling the internal pressure at the time of steam release to be not more than 115 kPa, which is an essential feature of the present invention. For instance, in a case where the content contains solids with moisture, the internal pressure of the packaging bag after steam release may temporarily exceed 115 kPa during the heating in the microwave oven. However, this phenomenon may be within the scope of the embodiment, and may not be regarded as a problem.

Figure 2:
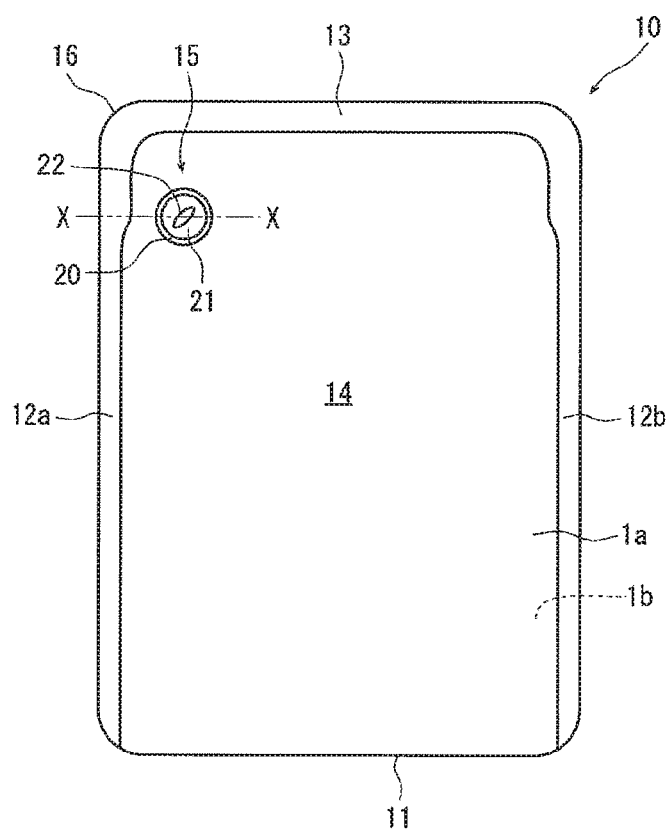
FIG. 2 is a plan view showing an example of packaging bag of the present invention.

FIG. 2 is a plan view showing an example of a packaging bag for heating in a microwave oven according to the present invention.

A packaging bag indicated with a reference numeral 10 as a whole is formed by folding once a multilayer film 1 to make films (1a, 1b) such that the welding layer may face inward, and by welding the layers at the both sides (side edges) and at the upper edge. As a result, the four sides of the packaging bag 10 are tightly sealed at the bottom portion 11, the side seal portions 12a, 12b and the top seal portion 13 (peripheral seal portion), thereby forming a housing portion 14.

Figure 3:
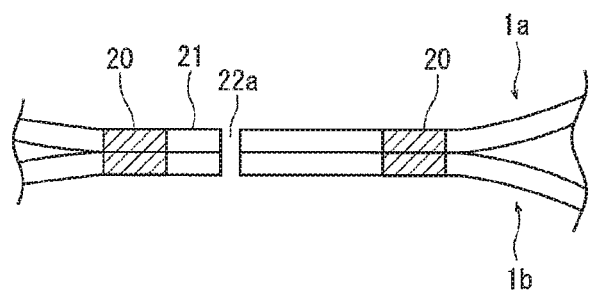
FIG. 3 is a cross-sectional view taken along a line X-X in FIG. 42.

In this embodiment, a steam releasing mechanism 15 is formed at the upper-left corner of the package 10. FIG. 3 is a cross-sectional view taken along a line X-X at the part of the steam releasing mechanism of FIG. 2. As shown in FIG. 2 and FIG. 3, the steam releasing mechanism 15 consists of a steam releasing seal portion 20, an unbonded portion 21, and a steam releasing portion 22 (22a). At the steam releasing seal portion 20, the overlapping multilayer films 1a and 1b are welded at a welding strength so that the films may be peeled off at the time the internal pressure is increased. The =bonded portion 21 is positioned surrounded by the steam releasing seal portion 20 where the overlapping multilayer films 1a, 1b are made unbonded, and the steam releasing portion 22 (22a) is formed to penetrate the multilayer films 1a, 1b at the unbonded portion 21.

In the specific example shown in these drawings, the steam releasing portion 22 is formed as an elliptical hole 22 (22a) having an apex of an arc facing the center in the plane of the package 10 and another apex facing the corner 16, and each side shaped as an arc with a maximal width. When the internal pressure increases and the steam flows from the middle of the package toward the ends of the packaging bag 10, the package swells such that the multilayer films 1a and 1b may be separated from each other. As a result, peeling of the welding portion starts at a part of the steam releasing portion 20, i.e., a part located closer to the middle of the packaging hag, and the steam flows into the unbonded portion 21. In this embodiment, since the apex of the arc constituting the steam releasing portion 22 faces the center of the packaging bag 10, the steam may be applied first from the apex of the arc of the steam releasing portion 22. The steam flowing from the middle of the package 1 to the peripheries increases the space between the arcs of the steam releasing portion 22 and widens the steam releasing portion 22, so that the steam can be released efficiently through the steam releasing portion 22.

This steam releasing portion as an elliptical hole has preferably a maximal width in a range of 3 to 20 mm to keep the internal pressure of the packaging bag to be not more than 115 kPa. This elliptical arc lateral width (maximal width) preferably has a curvature radius in a range of 2 to 100 mm relative to a chord having a width of 3 to 20 mm.

[Packaging Bag]

The packaging hag of the present invention is not limited to the aforementioned embodiment of three-side seal. The packaging bag can have various shapes, such as a four-side sealed packaging bag, which is provided by overlapping two multilayer films and sealing at four sides, a gusseted packaging bag, a standing type packaging bag, a pillow type packaging bag, and the like. [Steam releasing mechanism]

The steam releasing mechanism of the packaging bag of the present invention has at least a steam releasing portion having a maximal width of 3 to 20 mm, but the present invention is not limited to this embodiment as long as the bag can open automatically during heating in a microwave oven so as to keep the internal pressure of the packaging bag after steam release to be not more than 115 kPa. When the width of the steam releasing mechanism is less than 3 mm, the internal pressure of the packaging bag may exceed 115 kPa. When the width of the steam releasing mechanism is more than 20 mm, the content may leak out.

From the viewpoint of releasing the steam in the packaging bag generated by the heating in the microwave oven and avoiding leakage of the content, the steam releasing mechanism is formed preferably in the vicinity of the peripheral seal portion of the packaging bag.

Specifically, the steam releasing mechanism of the present invention is preferably formed on the circumference of a circle that is inscribed in the inner end of the peripheral edge seal portion of two short sides of the packaging bag or on the inside thereof (in FIG. 2, the seal portion inner edge and the bottom portion of the top seal portion 13) just like an initial breaking point of a vapor releasing seal portion in the aforementioned Patent document 1 (JP 2002-249176 A), though it may depend on the size of the packaging bag.

Further, the steam releasing mechanism consists preferably of a steam releasing portion, an unbonded portion formed around the steam releasing portion, and a steam releasing seal portion formed around the unbonded portion.

<Steam Releasing Portion>

In the embodiment shown in FIGS. 2 and 3, the steam releasing portion 22 is formed as an elliptical hole having an apex facing the center of the packaging bag 10 and an apex facing the corner 16 and further having an arc-like lateral width (maximal width). Alternatively, the steam releasing portion 22 may be an arc-like slit having an apex of arc facing the corner 16 of the packaging bag 10 as shown in FIG. 4(A). Or it may be shaped as a substantial rectangle having arc-like sides, which is tilted from the upper edge (top seal portion 13 side) to the side edge (side seal portion 12a side) of the packaging bag 10 and which has an apex facing the center of the packaging bag 10, as shown in FIG. 4(B). In a case where a straight line connecting both ends of an arc or a straight line connecting both ends of a slit is tilted, the tilt angle is preferably 0° (parallel) or 0±30° relative to a virtual line perpendicular to a straight line connecting a center of a straight line connecting the both ends and the center of the packaging bag.

Even when a hole is employed as the steam releasing portion, the hole preferably is shaped including the aforementioned arc, such as a semi-circle, a circle, an eclipse, or a semi-eclipse as shown in FIGS. 2 and 4(C). It is particularly preferable that the hole is shaped to include an arc having a curvature radius of 2 to 100 mm relative to a chord having a width of 3 to 20 mm, though the steam releasing portion may be a hole shaped substantially rectangular or substantially triangular as shown in FIGS. 4(B) and 4(D) as long as it is shaped to include an arc of the aforementioned range.

The slit is not limited to a tilted one, but it can be an arc slit as shown in in FIG. 4(E), for instance. In this slit, a line connecting the both ends of the arc and the side edge of the packaging bag 10 may be parallel to each other, and the apex of the arc may face inward on the packaging bag 10. An arc slit as an alternative not shown may be parallel to the upper edge of the packaging bag 10 and have an apex facing inward on the packaging bag 10. Alternatively, a slit having a straight line connecting the both ends of an arc parallel to the peripheral seal portion of the packaging bag 10 may be an arc slit that has an arc apex facing the peripheral seal portion side of the packaging bag 10. Furthermore, the aforementioned slit having a straight line connecting the both ends of the arc parallel to the peripheral seal portion (side edge and upper edge) may be replaced by an elliptical hole as shown in FIG. 4(F), i.e., a hole having a chord in the maximal width direction parallel to the peripheral seal portion.

As mentioned above, the steam releasing portion is formed to have a maximal width in a range of 3 to 20 mm. For this portion, various shapes conventionally known can be employed as long as the internal pressure after the steam release can be kept to be not more than 115 kPa.

Figure 5:
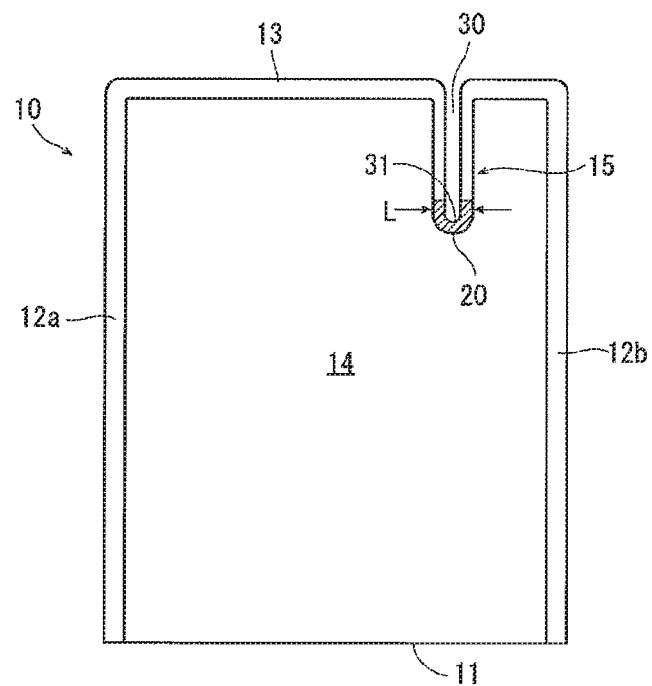
FIG. 5 is a view showing another example of steam releasing mechanism of packaging bag of the present invention.

For instance, the steam releasing portion may be a notch 30 as shown in FIG. 5. It extends from the peripheral seal portion (upper edge or side edge; in FIG. 5, a top seal portion 13 as the upper edge) of the packaging bag inwardly. In this example, a deepest portion 31 of the notch and the area surrounding the notch make the steam releasing portion 15, and the deepest portion 31 of the notch and the seal portion (the hatched part in FIG. 5) around it make the steam releasing seal portion 20, constituting a notched steam releasing mechanism.

Figure 6:
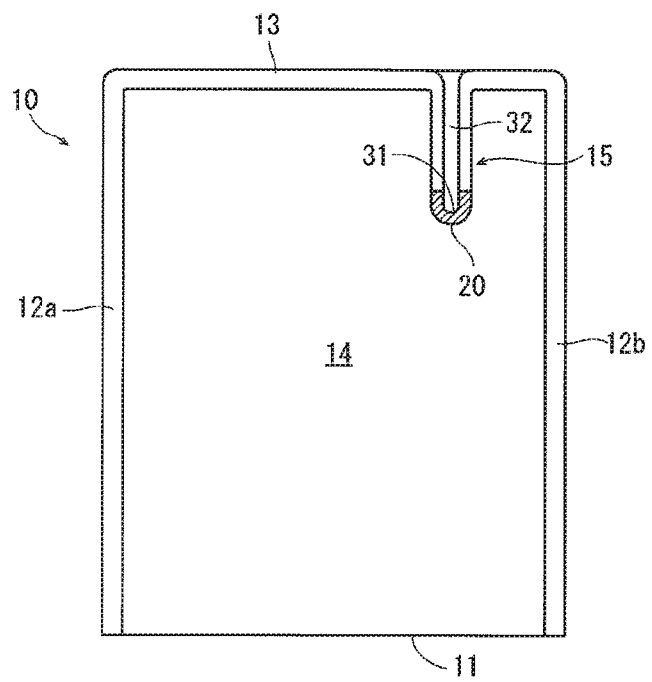
FIG. 6 is a view showing another example of steam releasing mechanism of packaging bag of the present invention.

In FIG. 5, the notch-shaped steam releasing portion is formed by notching both the two multilayer films 1a and 1b. Alternatively, the notch-shaped portion may be formed as an unbonded portion 32 without notching, where the films 1a and 1b may be overlapped as shown in FIG. 6. In this example, the steam releasing portion 15 having an unbound portion 32 where the films 1a, 1b are unbonded is opened toward the outer peripheral portion of the packaging bag. The steam releasing seal portion 20 of this opened steam releasing portion 15 constitutes an opened unbonded steam releasing mechanism, since the peripheral seal portion of the packaging bag also serves its function. There is no particular limitation for the notched steam releasing mechanism and the steam releasing mechanism of the opened unbonded portion as long as the maximal width (the width indicated with L in FIG. 5) is in a range of 3 to 20 mm and the internal pressure after the steam release is kept to be not more than 115 kPa.

Figure 4:
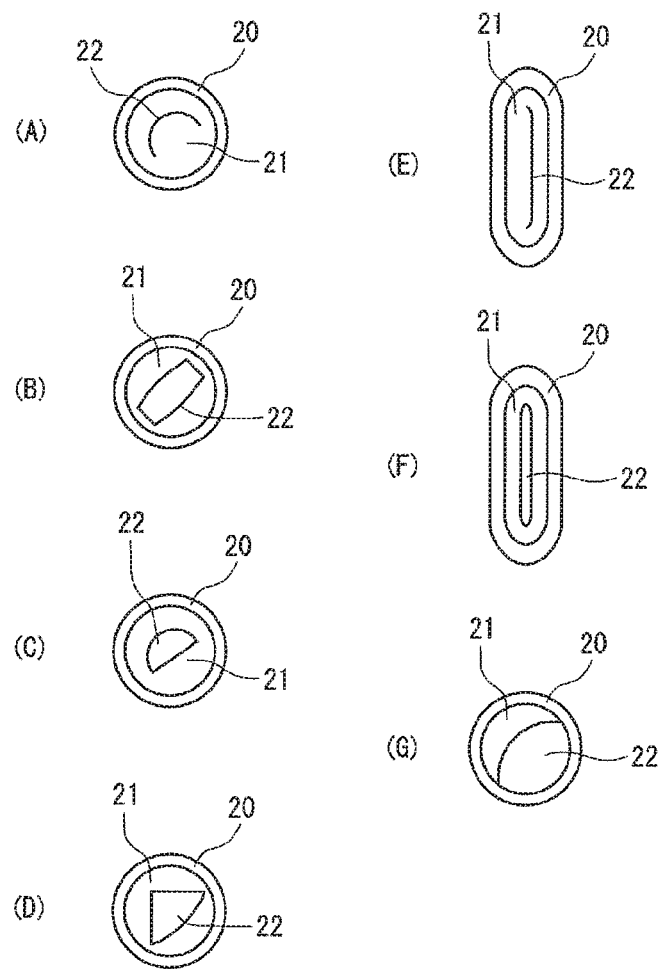
FIGS. 4(a) to 4(g) are views showing another example of steam releasing mechanism of packaging bag of the present invention.

Further, the steam releasing portion is not limited to the one formed to penetrate the packaging bag as shown any of FIGS. 2 to 4, but it may be formed only on one of the multilayer films.

<Unbonded Portion>

In the unbonded portion 21 of the specific example shown in FIG. 2, the area around the slit constituting the steam releasing portion is as a whole an unbonded portion. The present invention is not limited to this example, but various embodiments conventionally known can be employed. In one example as shown in FIG. 4(G), the inner periphery of the steam releasing seal portion 20 and a part of the hole 22 as the steam releasing portion coincide with each other, and the unhanded portion 21 is arranged to be adjacent only a part of the periphery of the steam releasing portion 22.

<Steam Releasing Seal Portion>

The steam releasing seal portion 20 is formed by welding the multilayer films so that it may be peeled to retreat with the increase in the internal pressure of the packaging bag when the packaging bag is heated in a microwave oven. In each of the illustrated specific examples, this steam releasing seal portion is provided to the whole periphery of the steam releasing portion 22. Alternatively, it may be provided on a part of the periphery as long as it blocks the steam releasing portion from the housing portion of the packaging bag.

EXAMPLES

The present invention will be specified below with reference to Examples, though the present invention is not limited to the Examples.

1. Measurement Method (1) Film Moisture Content (%)

A simple monolayer film, or a packaging bag filled with a content mentioned below (200±50 g) and tightly sealed is subjected to hydrothermal retort sterilization at 121° C. for 30 minutes. Immediately after the sterilization, a sample of 0.1±0.005 g was measured off and was heated at 230° C. so as to measure the moisture content of the monolayer film or the multilayer film by using Moisture Meter CA-200 manufactured by Mitsubishi Chemical Analytech Co., Ltd.

(2) Internal Pressure (kPa) after Steaming

Into a three-side sealed packaging bag produced by the method mentioned below, a content (200±50 g) and a measurement apparatus (PicoVACQ manufactured by TMI-Orion) were introduced. The packaging bag was then tightly sealed and heated at 1600 W for 3 minutes in a microwave oven. After the heating finished, the packaging bag was opened to take out the measurement apparatus. The measurement apparatus was connected to an analysis computer installed with xVACQ software manufactured by TMI-Orion so as to output data of internal pressure of the packaging bag from the time the internal pressure is released through the steam releasing portion of the packaging bag to the time the heating in the microwave oven finishes.

2. Evaluation of Heat Resistance

A packaging bag produced by the method mentioned below was filled with a heat-gelatinized flour liquid prepared as a model for a viscous food such as a commercially available curry roux packed in a packaging bag for heating in microwave oven. The flour liquid was prepared by introducing 6% of flour, 1% of cotton seed oil, 1.42% of sodium chloride as an inorganic salt, 0.36% of potassium chloride as an inorganic salt, and 0.08% of magnesium chloride hexahydrate as an inorganic salt (total content of the inorganic salts: 1.86%) at a mass concentration (w/w) relative to water. This flour liquid at 80° C. had a viscosity of 380 mPa·s in a 100 rpm measurement with a Brookfield model viscometer. A below-mentioned pouch for microwave oven was filled with 180 g of this flour liquid, tightly sealed and subjected to hydrothermal retort sterilization at 121° C. for 30 minutes. Immediately after the sterilization, the pouch was heated in a microwave oven at 500 W for 3 minutes. Holes in the pouch due to the damage by heating in the microwave oven were checked visually. Here, ◯ indicates no holes and no leakage, while X indicates occurrence of leakage due to holes.

Example 1

A base layer was prepared as a double layer of a 12 μm-thick biaxially-stretched polyethylene terephthalate (PET) film (moisture content: 0.4%) and a 15 μm-thick polybutylene terephthalate (PBT) film (moisture content: 0.3%) without providing a barrier layer, while a welding layer was provided as a 50 μm-thick unstretched polypropylene (CPP) film (moisture content: 0.01%). The base layer and the welding layers were dry-laminated using a urethane-based adhesive (3 μm) to form a multilayer film (moisture content: 0.9%).

Then, this multilayer film was sealed at the three sides to form a packaging bag for microwave oven. The packaging bag was 130 mm wide, 175 mm long, and it had a steam releasing mechanism at the upper corner. At the steam releasing structure, an elliptical hole having a lateral width of 3 mm, a longitudinal width of 1 mm, and a curvature radius of 2 mm relative to a chord of the lateral width was formed; an unbonded portion was formed around the steam releasing portion, and a steam releasing seal portion was formed around the unbonded portion.

The internal pressure of the packaging bag after steaming in this Example remained at not more than 115 kPa.

Example 2

A packaging bag for microwave oven was produced similarly to Example 1, except that a barrier layer was provided as a barrier film (moisture content: 0.4%). For the barrier layer, a vapor-deposited film of an inorganic oxide was prepared by a vacuum deposition method using silica as a vaporization source. The vapor-deposited film was provided on one surface of a 12 μm-thick biaxially-stretched polyethylene terephthalate (PET) film such that the vapor-deposited film of the barrier layer was laminated to face the base layer, thereby preparing a multilayer film (moisture content: 0.9%) including the barrier layer, the base layer and the welding layer. Then, the aforementioned evaluation of heat resistance was conducted.

The internal pressure of the packaging bag after steaming in this Example remained at not more than 115 kPa.

Example 3

A packaging bag for microwave oven was produced similarly to Example 2, except that the steam releasing portion of the steam releasing mechanism was formed as an elliptical hole having a lateral width of 8 mm, a longitudinal width of 2 mm, and a curvature radius of 16 mm relative to a chord of the lateral width. Then, the aforementioned evaluation of heat resistance was conducted.

The internal pressure of the packaging bag after steaming in this Example remained at not more than 103 kPa.

Example 4

A packaging bag for microwave oven was produced similarly to Example 2, except that the steam releasing portion of the steam releasing mechanism was formed as an elliptical hole having a lateral width of 20 mm, a longitudinal width of 2 mm, and a curvature radius of 100 mm relative to a chord of the lateral width. Then, the aforementioned evaluation of heat resistance was conducted.

The internal pressure of the packaging bag after steaming in this Example remained at not more than 102 kPa.

Example 5

A packaging bag for microwave oven was produced similarly to Example 3, except that a barrier layer was provided as a barrier film (moisture content: 0.6%) on one surface of a 12 μm-thick biaxially-stretched polyethylene terephthalate (PET) film. For the barrier layer, a coating layer was provided by applying a coating agent containing a compound having a metalloxane bond. The vapor-deposited film of the barrier layer was laminated to face the base layer, thereby preparing a multilayer film (moisture content: 0.9%) including the barrier layer, the base layer and the welding layer. Then, the aforementioned evaluation, of heat resistance was conducted.

The internal pressure of the packaging bag after steaming in this Example remained at not more than 103 kPa.

Example 6

A packaging bag for microwave oven was produced similarly to Example 3, except that the base layer was formed using polybutylene terephthalate (PET) and polyethylene terephthalate (PET) mixed at a rate of PBT:PET=15:95 (weight ratio) to be a 12 μm-thick film (moisture content: 0.2%), such that the thus obtained multilayer film had a moisture content of 0.4%. Then, the aforementioned evaluation of heat resistance was conducted.

The internal pressure of the packaging bag after steaming in this Example remained at not more than 103 kPa.

Example 7

A packaging bag for microwave oven was produced similarly to Example 3, except that the base layer was prepared as a 12 μm-thick biaxially-stretched polyethylene terephthalate (PET) film (moisture content 0.4%) such that the thus obtained multilayer film had a moisture content of 0.2%. Then, the aforementioned evaluation of heat resistance was conducted.

The internal pressure of the packaging bag after steaming in this Example remained at not more than 103 kPa.

Example 8

A packaging bag for microwave oven was produced similarly to Example 3, except that the base layer was prepared as a 12 μm-thick polyethylene naphthalate (PEN) film (moisture content: 0.5%) such that the thus obtained multilayer film had a moisture content of 0.3%. Then, the aforementioned evaluation of heat resistance was conducted.

The internal pressure of the packaging bag after steaming in this Example remained at not more than 103 kPa.

Example 9

A packaging bag for microwave oven was produced similarly to Example 3, except that the base layer was prepared as a 12 μm-thick polycarbonate (PC) film (moisture content: 0.2%) such that the thus obtained multilayer film had a moisture content of 0.3%. Then, the aforementioned evaluation of heat resistance was conducted.

The internal pressure of the packaging bag after steaming in this Example remained at not more than 103 kPa Example 10

A packaging bag for microwave oven was produced similarly to Example 3, except that the barrier layer was provided as a barrier film (moisture content: 0.3%). For the barrier layer, a vapor-deposited film of an inorganic oxide was prepared by a vacuum deposition method using alumina as a vaporization source. The vapor-deposited film was provided on one surface of a 12 μm-thick biaxially-stretched polyethylene terephthalate (PET) film such that the vapor-deposited film of the barrier layer was laminated to face the base layer, thereby preparing a multilayer film (moisture content 0.9%) including the barrier layer, the base layer and the welding layer. Then, the aforementioned evaluation of heat resistance was conducted.

The internal pressure of the packaging bag after steaming in this Example remained at not more than 10:3 kPa.

Example 11

A packaging bag for microwave oven was produced similarly to Example 10, except that a multilayer film (moisture content: 0.9%) was prepared by laminating the base layer, the barrier layer and the welding layer in this order when viewed from the outside. Then, the aforementioned evaluation of heat resistance was conducted.

The internal pressure of the packaging bag after steaming in this Example remained at not more than 103 kPa.

Example 12

A packaging bag for microwave oven was produced similarly to Example 7, except that the barrier layer was provided as a barrier film (moisture content: 0.3%). For the barrier layer, a vapor-deposited film of an inorganic oxide was prepared by a vacuum deposition method using silica as a vaporization source. The vapor-deposited film was provided on one surface of a 15 μm-thick polybutylene terephthalate (PET) film such that the vapor-deposited film of the barrier layer was laminated to face the base layer, thereby preparing a multilayer film (moisture content 0.9%) including the barrier layer, the base layer and the welding layer. Then, the aforementioned evaluation of heat resistance was conducted.

The internal pressure of the packaging bag after steaming in this Example remained at not more than 103 kPa.

Example 13

A packaging bag for microwave oven was produced similarly to Example 12, except that a multilayer film (moisture content: 0.9%) was prepared by laminating the base layer, the barrier layer and the welding layer in this order when viewed from the outside. Then, the aforementioned evaluation of heat resistance was conducted.

The internal pressure of the packaging bag after steaming in this Example remained at not more than 103 kPa.

Example 14

A packaging bag for microwave oven was produced similarly to Example 12, except that a barrier layer was provided as a barrier film (moisture content: 0.3%). For the barrier layer, a vapor-deposited film of an inorganic oxide was prepared by a vacuum deposition method using alumina as a vaporization source. The vapor-deposited film was provided on one surface of a 15 μm-thick polybutylene terephthalate (PET) film. Then, the aforementioned evaluation of heat resistance was conducted.

The internal pressure of the packaging bag after steaming in this Example remained at not more than 103 kPa.

Example 15

A packaging bag for microwave oven was produced similarly to Example 14, except that a barrier layer was provided as a barrier film (moisture content: 0.4%). For the barrier layer, a vapor-deposited film of an inorganic oxide was prepared by a vacuum deposition method using alumina as a vaporization source. The vapor-deposited film was provided on one surface of a 25 μm-thick polybutylene terephthalate (PBT) film without providing a base layer, thereby forming a multilayer film (moisture content: 0.9%) including the barrier layer and a welding layer in this order when viewed from the outside, which were laminated such that the vapor-deposited layer of the barrier layer would face the welding layer. Then, the aforementioned evaluation of heat resistance was conducted.

The internal pressure of the packaging bag after steaming in this Example remained at not more than 103 kPa.

Example 16

A packaging bag for microwave oven was produced similarly to Example 15, except that the barrier layer was formed as a barrier film (moisture content: 0.4%) by providing a vapor-deposited film of an inorganic oxide by a vacuum deposition method on one surface of a 25 μm-thick film prepared by using polybutylene terephthalate (PBT) and polyethylene terephthalate (PET) mixed at a ratio of PET:PET=15:85 (weight ratio), the thus obtained multilayer film had a moisture content of 0.6%. Then, the aforementioned evaluation of heat resistance was conducted.

The internal pressure of the packaging bag after steaming in this Example remained at not more than 103 kPa.

Example 17

A packaging bag for microwave oven was produced similarly to Example 10, except that a barrier layer was provided as a harrier film (moisture content: 0.4%). For the barrier layer, a vapor-deposited film of an inorganic oxide was prepared by a vacuum deposition method using alumina as a vaporization source. The vapor-deposited film was provided on one surface of a 25 μm-thick biaxially-stretched polyethylene terephthalate (PET) film without providing a base layer, thereby forming a multilayer film (moisture content: 0.4%) including a barrier layer and a welding layer in this order when viewed from the outside, which were laminated such that the vapor-deposited layer of the barrier layer would face the welding layer. Then, the aforementioned evaluation of heat resistance was conducted.

The internal pressure of the packaging bag after steaming in this Example remained at not more than 103 kPa.

Example 18

A packaging bag for microwave oven was produced similarly to Example 12, except that a barrier layer was provided as a barrier film (moisture content: 0.8%) on one surface of a 15 μm-thick polybutylene terephthalate (PET) film. For the barrier layer, a coating layer was provided by applying a coating agent containing a compound having a metalloxane bond. The vapor-deposited film of the barrier layer was laminated to face the base layer, thereby preparing a multilayer film (moisture content: 0.9%) including the barrier layer, the base layer and the welding layer. Then, the aforementioned evaluation of heat resistance was conducted.

The internal pressure of the packaging bag after steaming in this Example remained at not more than 10:3 kPa.

Example 19

A packaging bag for microwave oven was produced similarly to Example 18, except that a multilayer film (moisture content: 0.9%) was prepared by laminating the base layer, the barrier layer and the welding layer in this order when viewed from the outside. Then, the aforementioned evaluation of heat resistance was conducted.

The internal pressure of the packaging bag after steaming in this Example remained at not more than 103 kPa.

Comparative Example 1

A packaging bag for microwave oven was produced similarly to Example 3, except that the base layer in Example 2 was replaced by a 15 μm-thick nylon (NY) film (moisture content: 3.6%) such that the thus obtained multilayer film had a moisture content of 2.4%. Further, the steam releasing portion of the steam releasing mechanism was formed as a round hole having a diameter of 2 mm and a curvature radius of 1.0 mm relative to a chord of the lateral width. Then, the aforementioned evaluation of heat resistance was conducted.

The internal pressure of the packaging bag after steaming in this experiment was 123 kPa, and the internal pressure remained higher than 115 kPa.

Comparative Example 2

A packaging bag for microwave oven was produced similarly to Comparative Example 1, except that the steam releasing portion of the steam releasing mechanism was formed as an elliptical hole having a lateral width of 8 mm, a longitudinal width of 2 mm, and a curvature radius of 16 mm relative to a chord of the lateral width. Then, the aforementioned evaluation of heat resistance was conducted.

The internal pressure of the packaging bag after steaming in this experiment remained at not more than 103 kPa.

Comparative Example

A packaging bag for microwave oven was produced similarly to Example 2, except that the steam releasing portion of the steam releasing mechanism was formed as a round hole having a diameter of 2 mm and a curvature radius of 1 mm relative to a chord of the lateral width. Then, the aforementioned evaluation of heat resistance was conducted.

The internal pressure of the packaging bag after steaming in this experiment was 123 kPa, and the internal pressure remained higher than 115 kPa.

Comparative Example 4

A packaging hag for microwave oven was produced similarly to Example 10, except that the steam releasing portion of the steam releasing mechanism was formed as a round hole having a diameter of 2 mm and a curvature radius of 1 mm relative to a chord of the lateral width. Then, the aforementioned evaluation of heat resistance was conducted.

The internal pressure of the packaging bag after steaming in this experiment was 123 kPa, and the internal pressure remained higher than 115 kPa.

Comparative Example 5

A packaging bag for microwave oven was produced similarly to Example 13, except that the steam releasing portion of the steam releasing mechanism was formed as a round hole having a diameter of 2 mm and a curvature radius of 1 mm relative to a chord of the lateral width. Then, the aforementioned evaluation of heat resistance was conducted.

The internal pressure of the packaging bag after steaming in this experiment was 123 kPa, and the internal pressure remained higher than 115 kPa.

Comparative Example 6

A packaging bag for microwave oven was manufactured similarly to Example 15, except that the steam releasing portion of the steam releasing mechanism was formed as a round hole having a diameter of 2 mm and a curvature radius of 1 mm relative to a chord of the lateral width. Then, the aforementioned evaluation of heat resistance was conducted.

The internal pressure of the packaging bag after steaming in this experiment was 123 kPa, and the internal pressure remained higher than 115 kPa.

The experimental results in the above Examples and Comparative Examples are shown in Table 1.

TABLE 1

| | Layer constitution | | |
|---|---|---|---|
| | Barrier layer | Base layer | welding layer |
| Example 1 | None | 12 μm PET/ | 50 μm CPP |
| Example 2 | 12 μm PET/ | 15 μm PBT | |
| Example 3 | silica vapor-deposited film | | |
| Example 4 | | | |
| Example 5 | 12 μm PET/ | | |
| | metalloxane-based coating film | | |
| Example 6 | 12 μm PET/ | 12 μm PBT/ | |
| | silica vapor-deposited film | PET blend | |
| Example 7 | | 12 μm PET | |
| Example 8 | | 12 μm PEN | |
| Example 9 | | 12 μm PC | |
| Examples 10, 11 | 12 μm PET/ | 15 μm PBT | |
| | alumina vapor-deposited film | | |
| Examples 12, 13 | 15 μm PBT/ | 12 μm PET | |
| | silica vapor-deposited film | | |
| Example 14 | 15 μm PBT/ | 15 μm PBT | |
| Example 15 | alumina vapor-deposited film | None | |
| Example 16 | 12 μm PBT/PET blend/ | None | |
| | alumina vapor-deposited film | | |
| Example 17 | 12 μm PET/ | None | |
| | alumina vapor-deposited film | | |
| Comparative Example 1 | 12 μm PET/ silica vapor-deposited film | 15 μm NY | 50 μm CPP |
| Comparative Example 2 | | | |
| Comparative Example 3 | | 15 μm PBT | |
| Comparative Example 4 | 12 μm PET/ alumina vapor-deposited film | | |
| Comparative Example 5 | 15 μm PBT/ silica vapor-deposited film | 12 μm PET | |
| Comparative Example 6 | 15 μm PBT/ alumina vapor-deposited film | None | |

| | Moisture content of multilayer film (%) | Steam releasing portion Shape | Curvature radius (mm) | Internal pressure of packaging bag after steaming (kPa) | Heat resistance evaluation |
|---|---|---|---|---|---|
| Example 1 | 0.9 | 3 mm × 1 mm elliptical hole | 2 | 115 | ○ |
| Example 2 | | | | | ○ |
| Example 3 | | 8 mm × 2 mm elliptical hole | 16 | 103 | ○ |
| Example 4 | | 20 mm × 2 mm elliptical hole | 100 | 102 | ○ |
| Example 5 | | 8 mm × 2 mm elliptical hole | 16 | 103 | ○ |
| Example 6 | 0.4 | | | | ○ |
| Example 7 | 0.2 | | | | ○ |
| Example 8 | 0.3 | | | | ○ |
| Example 9 | | | | | ○ |
| Examples 10, 11 | 0.9 | | | | ○ |
| Examples 12, 13 | 0.9 | | | | ○ |
| Example 14 | 0.9 | | | | ○ |
| Example 15 | 0.8 | | | | ○ |
| Example 16 | 0.4 | | | | ○ |
| Example 17 | 0.3 | | | | ○ |
| Comparative Example 1 | 2.4 | φ2 mm hole | 1 | 123 | X |
| Comparative Example 2 | | 8 mm × 2 mm elliptical hole | 16 | 103 | X |
| Comparative Example 3 | 0.9 | φ2 mm hole | 1 | 123 | X |
| Comparative Example 4 | | | | | X |
| Comparative Example 5 | | | | | X |
| Comparative Example 6 | 0.8 | | | | X |

This result indicates that the packaging baa of the present invention can prevent leakage of content: caused by increase of the internal pressure. Moreover, the packaging bag has excellent heat resistance even when it is filled with a content like that used in Examples, though such a content can often cause thermal damage. It clarifies that the packaging bag can prevent effectively thermal damage.

INDUSTRIAL APPLICABILITY

As described above, the thermal damage of a packaging bag for heating in a microwave oven occurs when the internal pressure is increased excessively by heating in the microwave oven. The thermal damage may be severe particularly when the contents contain high concentrations of oils and metal salts and have high viscosity.

The packaging bag of the present invention can avoid the thermal damage even when it is filled with such contents. Therefore, the packaging bag of the present invention can contain such materials so as to be used as a packaging bag for heating in a microwave oven.

Specifically, the packaging bag of the present invention can contain three kinds of metal salts of sodium, potassium and magnesium of 0.7 to 2.7% in total and oils of 0.5 to 28%, and as a result, the packaging bag can contain food having a viscosity of 150 to 2900 mPa·s at a measurement with a Brookfield model viscometer under conditions of 80° C. and 100 rpm.

EXPLANATIONS OF LETTERS OR NUMERALS

1: multilayer film, 2: barrier layer, 3: base layer, 4: welding layer, 5: adhesive layer, 10: packaging bag, 11: bottom portion, 12: side seal portion, 13: top seal portion, 14: housing portion, 15: steam releasing mechanism, 16: corner, 20: steam releasing seal portion, 21: unbonded portion, 22: steam releasing portion, 30: notch, 31: deepest portion of notch, 32: unbonded portion

The invention claimed is:

1. A packaging bag including a multilayer film and having a steam releasing mechanism, wherein
the multilayer film has at least a base layer and a welding layer;
the multilayer film has a moisture content of not more than 1.0% in a state in which the packaging bag is filled with a content;
each of the layers constituting the multilayer film has a moisture content of not more than 0.6% immediately after retort sterilization under conditions of 121° C. and 30 minutes, and the layers of the multilayer film except the welding layer and the adhesive layer are formed of a resin having a melting point of not lower than 220° C.;
the steam releasing mechanism has at least a steam releasing portion formed to have a maximal width in a range of 3 to 20 mm; and
the packaging bag has an internal pressure kept to be not more than 115 kPa during a period from the time the internal pressure is released through the steam releasing portion as a result of an increase in the internal pressure caused by heating in a microwave oven to the time the heating in the microwave oven finishes.

2. The packaging bag according to claim 1, wherein the base layer is formed of a resin selected from the group consisting of a polyester resin, a polycarbonate resin, and a polyetheretherketone resin.

3. The packaging bag according to claim 2, wherein the base layer is formed of a material selected from the group consisting of polyethylene terephthalate, polybutylene terephthalate, polyethylene naphthalate, a blend of polyethylene terephthalate and polybutylene terephthalate, and a blend of polyethylene terephthalate and polyethylene naphthalate.

4. The packaging bag according to claim 1, wherein the multilayer film has a multilayer structure including a barrier layer formed of a polyester resin and having either a vapor-deposited layer or a coating layer arranged to face the base layer.

5. The packaging bag according to claim 1, wherein the multilayer film has a layer constitution including the barrier layer, the base layer and the welding layer in this order when viewed from the outside, the barrier layer is formed of a polyethylene terephthalate resin and has either the vapor-deposited layer or the coating layer, the base layer is formed of polybutylene terephthalate, and the welding layer is formed of an unstretched polypropylene.

6. The packaging bag according to claim 1, wherein the multilayer film has a layer constitution including the barrier layer, the base layer and the welding layer in this order when viewed from the outside, the barrier layer is formed of a polybutylene terephthalate resin and has either the vapor-deposited layer or the coating layer, the base layer is formed of polyethylene terephthalate, and the welding layer is formed of an unstretched polypropylene.

7. The packaging bag according to claim 1, wherein the multilayer film has a layer constitution including the base layer, the barrier layer and the welding layer in this order when viewed from the outside, the base layer is formed of polybutylene terephthalate, the barrier layer is formed of a polyethylene terephthalate resin and has either the vapor-deposited layer or the coating layer, and the welding layer is formed of an unstretched polypropylene.

8. The packaging bag according to claim 1, wherein the steam releasing portion is shaped to have an arc having a curvature radius of 2 to 100 mm relative to a chord having a width of 3 to 20 mm.

9. The packaging bag according to claim 1, wherein
the steam releasing mechanism is arranged in the vicinity of a peripheral seal portion of the packaging bag, and
a maximal width direction of the steam releasing portion is tilted from an upper edge to a side edge of the packaging bag.

10. The packaging bag according to claim 1, wherein
the steam releasing mechanism is arranged in the vicinity of the peripheral seal portion of the packaging bag, and
the maximal width direction of the steam releasing portion is in parallel with the side edge or the upper edge of the packaging bag.

11. The packaging bag according to claim 1, wherein the steam releasing mechanism includes the steam releasing portion, an unbonded portion formed around the steam releasing portion, and a steam releasing seal portion formed around the unbonded portion.

* * * * *